May 15, 1962 G. C. DEVOL 3,035,253

MAGNETIC STORAGE DEVICES

Filed April 9, 1956

2 Sheets-Sheet 1

INVENTOR.
GEORGE C. DEVOL
BY Paul S. Martin
ATTORNEY

May 15, 1962

G. C. DEVOL 3,035,253

MAGNETIC STORAGE DEVICES

Filed April 9, 1956

2 Sheets-Sheet 2

INVENTOR.
GEORGE C. DEVOL
BY Paul S. Martin
ATTORNEY

United States Patent Office 3,035,253

Patented May 15, 1962

3,035,253

MAGNETIC STORAGE DEVICES

George C. Devol, Greenwich, Conn.

Filed Apr. 9, 1956, Ser. No. 577,117
29 Claims. (Cl. 340—174)

The present invention relates to magnetic storage and control devices.

An object of this invention is to provide novel forms of storage devices capable of yielding output representing information stored therein. A related object is to provide a novel assembly of devices capable of concurrently reading out bits of information previously entered therein individually in any manner, for example in sequence. A further related object is to provide novel devices for reading in the information bits into such storage devices.

A number of different transducers are shown each having certain special advantages and yielding different forms of response to magnetic fields. Most of the transducers described include a magnetometer of some form, together with a semipermanent magnetic control element in which the information is stored. A magnetometer, as the term is used here, is a device which produces an output signal that represents a magnetic field to which the device is exposed. Magnetometers should be distinguished from an ordinary coil or a magnetic sensing head that depends on induction by movement relative to the magnetic field to produce an output signal and which, accordingly, responds to rate-of-change of magnetic fields and not to magnetic fields per se. The control element mentioned above is termed semi-permanent because it retains magnetization in the manner of magnetic sound recording media, but the magnetization is readily erased or reversed as the application may require. Further, a recording or magnetizing device is movable relative to the control elements. In some forms, one magnetizing device is moved into magnetizing relation with a series of magnetic control elements. In other cases, as where a permanent magnet may constitute the magnetizing device, a separate movable magnetizing device may be associated with each transducer.

The latter arrangement is suggestive of a keyboard of novel construction, being a highly reliable substitute for electric switch keyboards; and while such application is definitely contemplated as a feature of the present invention, this concept is not limited to the keyboard application.

A further feature of the invention resides in a transducer or magnetic detector that moves past and scans a series of locations at which selectively operable magnetic storage or control elements are located. The transducer responds differently to different states of such elements, and the different responses may be used in many diverse applications. For example, the transducer may step past the series of control elements, to be arrested by its own response and at the same time to select a record to be played in an automatic phonograph, where each record is associated with a particular magnetic storage element. In the illustrative application described in detail below, a scanning transducer is employed as the generator in an exemplary telemetering system.

Illustrative applications of the invention in its various aspects are described in detail below, from which further novel features and objects will be apparent. In this description, reference is made to the annexed drawings forming part of this disclosure.

Figure 1:
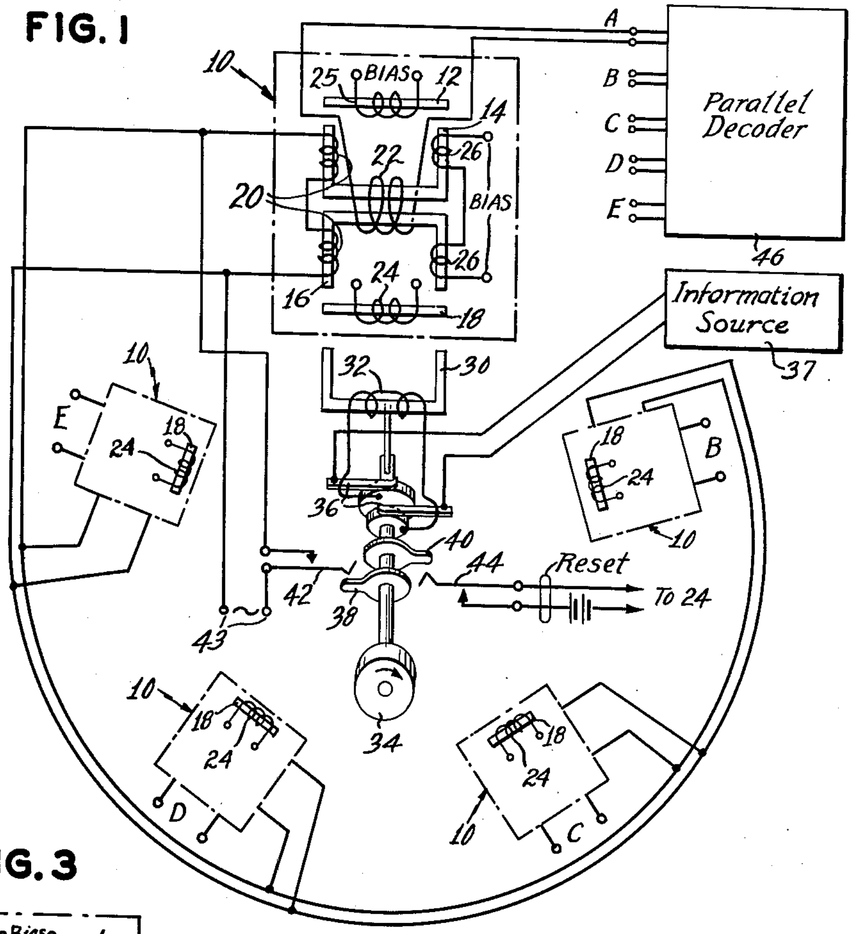
FIG. 1 is the wiring diagram of an application of one aspect of the invention.

Referring now to FIG. 1 there is shown a transducer or storage unit 10 including an assembly of magnetic core elements 12, 14, 16 and 18. A two-part coil 20 has respective halves thereof wound about core elements 14 and 16, and another coil 22 has portions extending about both core elements 14 and 16. The portions of windings 20 and 22 which extend about core element 14 may be considered to be in the same sense whereas the portions of windings 20 and 22 about core element 16 are in opposite sense. A two-part winding 26 has portions thereof about elements 14 and 16, and a direct current bias supply (not shown) is provided for winding 26. The sense of the portions of winding 26 correspond to that of the portions of winding 20.

Element 12 may be a permanent magnet, if desired, or it may be of highly permeable magnetic material having a winding 25 for developing a sustained magnetic bias in core element 12. The field from this magnetic element, when added to that of bias winding portion 26 on core element 14 drives core element 14 into its region of saturation. The bias of winding 26 is adjusted to be only enough to drive core element 14 partway toward saturation. Both core elements 14 and 16 are of high permeability material and of physical proportions to be readily saturated, but preferably of low magnetic retentivity.

Magnetic element 18 fixed opposite core element 16 will be referred to as a semi-permanent magnetic storage or control element. It is of a material which is highly retentive, yet its magnetization may be erased and reversed, in the manner of magnetic sound-recording tape. Control element 18 has a winding 24 about it, and a source of "reset" potential is connected to this winding at appropriate times for conditioning it for further recording operations. Depending on the form of the remainder of unit 10 and the output circuit connected thereto, the "reset" may be either alternating current, or it may be polarized direct current, polarized opposite to that of the recording element 30, 32.

Separate from unit 10 is a recording or magnetizing device 30 having a coil 32 so as to constitute an electro-magnet. This electro-magnet is movable, both away from unit 10 and into position adjacent unit 10, from time to time, for establishing in control element 18 the desired control magnetization, optionally changing it or leaving it unchanged in the condition left by coil 24.

The operation of the unit 10 in FIG. 1 may advantageously be described before the entire system of FIG. 1 is detailed.

Figure 2:
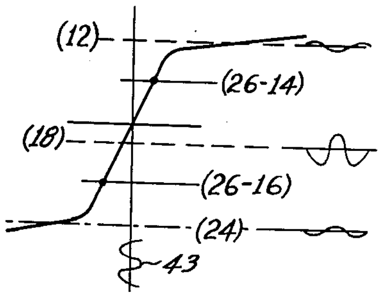
FIG. 2 is a diagram illustrating different phases of the operation of the transducer in FIG. 1.

It may be assumed that windings 25 and 26 are excited with the appropriate level of direct current, so that bias is established in core elements 14 and 16 which produce flux (26—14) and (26—16) in those core elements as represented in FIG. 2. Winding 25 magnetizes core element 12 and thereby produces bias (12) in core element 14, as represented in FIG. 2. The steady state condition of core element 14 in this illustration is, accordingly, that of saturation resulting from the combined effects of core 12 and winding 26. Core element 16 is biased only partway toward saturation by coil 26. Bias winding 26, while not altogether necessary, greatly enhances sensitivity of the device.

At the outset it may be further assumed that control element 18 has been magnetized by the "reset" coil 24 with direct current energization. The field of control element 18, added to that of coil 26, produces saturation in core element 16, as represented by the dot-dash line (24) in FIG. 2.

Under these conditions, both coil portions 20 may be excited with alternating current, and each will tend to induce in output winding 22 a very low level of output; and these low level outputs will be opposite in phase and self-cancelling. In this respect, core elements 14 and 16 and windings 20 and 22 represent a transformer having controlled coupling depending upon the saturation of its core elements.

It may now be assumed that electromagnet 30, 32 is positioned opposite to control element 18, and a pulse of direct current is impressed on coil 32 of a polarity to reverse the magnetization of magnetic storage or control element 18 or alternating current may be impressed on coil 32 to demagnetize element 18. In FIG. 2 reversed magnetization of element 18 is represented, in its effect on core 16, by the broken line designated (18). This is the magnetic condition of core element 16 resulting from the magnetic field of control element 18 which opposes the bias established by the winding portion 26 on core element 16. The current in winding 32 may decay, and the entire electromagnet 30—32 may be removed without disturbing the retained state of magnetic element 18 or the resulting effects. Under these conditions, the coil portions 20 about core element 16 will be effective to induce a very substantial level of alternating current in winding 22 whereas the corresponding portion of coil 20 on core element 14 will have only a negligible opposing effect in winding 22. Consequently a very substantial level of net output will be produced. This output is available at any time after electromagnet 30, 32 has been put into its recording relation with element 18. The output is very low if the electromagnet 30—32 is positioned opposite control element 18 but is not energized and therefore does not change the initial or "reset" condition of control element 18. Electromagnet 30, 32 is consequently selectively or optionally effective to "turn on" unit 10 which thereafter remains "on" even though the read-in electromagnet 30—32 has moved on.

If A.-C. excitation is impressed on coil 32 as mentioned above, thereby to demagnetize storage core 18 that previously was magnetized by "reset" current in coil 24, the magnetic condition of core 16 shifts from the dot-dash line (24) to the level (26—16) in FIG. 2. High output is thus obtained from unit 10 using A.-C. for read-in purposes, much as in the case of reversed magnetization of core 18 (compared to its "reset" polarity) by using D.-C. for read-in purposes in coil 32 as discussed in detail above.

An appropriate drive 34 is diagrammatically illustrated in FIG. 1 as being mechanically coupled to electromagnet 30, 32 for stepping that recording device arcuately from each unit 10 to the next cyclically. Winding 32 may be energized by connections to slip rings 36 which extend to an energizing information source 37. Also associated with slip rings 36 are cams 38 and 40 which operate cam contacts 42 and 44. Cam contacts 42 are in control relation to the alternating current supplied from terminals 43 to windings 20 of several units 10; and cam contacts 44 are effective at the proper time, to impress a "reset" signal from a D.-C. source (not shown) on the windings 24 of the several units 10. Each of the units 10 is of the same internal construction as that described.

Electromagnet 30, 32 is indexed in sequence past a series of storage elements 18. Units 10 have output terminals designated A, B, C, D and E. In each position, the electromagnet 30—32 is either energized or not, in order to register the desired control information from source 37 into the storage unit 18 of the related unit 10. After the electromagnet has passed all of the storage units of the apparatus shown, "read-out" contacts 42 are closed, and output is available (or no output is produced) from the respective windings 22, depending upon the magnetic states of the respective control elements 18.

Units 10 have their outputs connected, in the illustration of FIG. 1 to a "parallel decoder" 46. The apparatus in FIG. 1, may for example, be the receiver of a telemetering system in which the information to be telemetered is to be converted to a combinational code, and in which the transmitter is synchronized with drive element 34 of the receiver. The details of parallel decoder 46 are well known and are omitted as being unnecessary to the full understanding of the invention. Relay whiffletrees are an example of such device.

Significantly, the electro-magnet 30, 32 is a recording device which is movable relative to the several control elements 18 and the various storage and transducer units 10. The information left by device 30, 32 is serially "read in" to units 10 and thereafter is concurrently available at all of the units. It would be available immediately after having been recorded and continuously thereafter except that in this application contacts 42 keep the alternating current energizing circuit to winding 20 open until all units 10 have been exposed to unit 30, 32. This read-out operation does not disturb the magnetic condition of element 18.

After the information has been registered in parallel decoder 46, reset contacts 44 are energized to restore the initial condition of control elements 18, namely that appropriate to raise cores 1 into saturation as designated (24) in FIG. 2.

It is evident that the polarities of the currents in both windings 24 and 32 may be reversed, with resulting reversal in the selectively high or nominal output of unit 10, in response to the energization or lack of energization of the winding 32 when that winding is in control relation to the respective magnetic elements 18. More specifically, the current in coil 24 as described above may be reversed, in which condition the normal condition of core 18 is represented by the broken line (18) in FIG. 2; and correspondingly the read-in current in coil 32 will then be the reverse of that previously described, so as to shift core 16 from the magnetic condition represented by line (18) to that represented by line (24). With these polarities of reset and read-in currents, the normal condition of unit 10 (after "reset" but before "read-in") is such as to yield a high output. With the subsequent magnetization of core 18 by read-in electromagnet 30—32 so as to shift core 16 to the magnetic condition represented by line (24), the output of unit 10 would drop to a low, nominal value. Thus, depending upon the relative polarities of the reset current and the read-in current in coils 24 and 32 in relation to the magnetic bias developed in core 12, the normal condition of unit 10 may be such as to yield only a nominal output after being "reset" or it may have a high output after being "reset"; and correspondingly the output of unit 10 after having been subjected to read-in magnetization by electromagnet 30—32 will be high in the one case of low normal output from unit 10, while the output of unit 10 after being subjected to read-in magnetization by electromagnet 30—32 will be low where unit 10 normally is arranged as above described to have a high output.

A modified form of transducer 10′ may be employed (FIG. 3) in the apparatus of FIG. 1 in which a control element 18′ and a reset winding 24′ is used together with electromagnet 30, 32 which appears in FIG. 1. The unit 10′ of FIG. 3 has a single core element 48′ of highly permeable easily saturable magnetic material having three windings 20′, 22′ and 26′, corresponding to like windings in the unit of FIG. 1. In FIG. 4 it is seen that core element 48′ is biased partway toward saturation by coil 26′. After winding 24′ has magnetized control element 18, core 48′ is driven into saturation as represented by the broken line designated (24′).

When electromagnet 30, 32 is energized to reverse the polarity of control element 18′ the magnetic bias produced by winding 26′ is seen to be reduced or bucked to the extent represented by the lower dot-dash line designated (32′) in FIG. 4.

If a single square-wave pulse is impressed on winding 20′ for read-out and if core element 48′ is saturated, only nominal pulse output will be available at winding 22′. However, when the electromagnet 30, 32 has been energized and control element 18′ is in its reversed magnetic condition relative to the bias in core 48′, pulse input at winding 20′ will produce correspondingly large output at winding 22′.

Where units 10′ are substituted in FIG. 1 for that shown, the same general operation is achieved, in which parallel output of the information is available from the several units 10 whereas, with an electromagnet that moves into magnetizing relation with several control elements 18 or 18′ can be operated to "read in" information to the several units 10 in any desired sequence.

Figures 5, 6, 7:
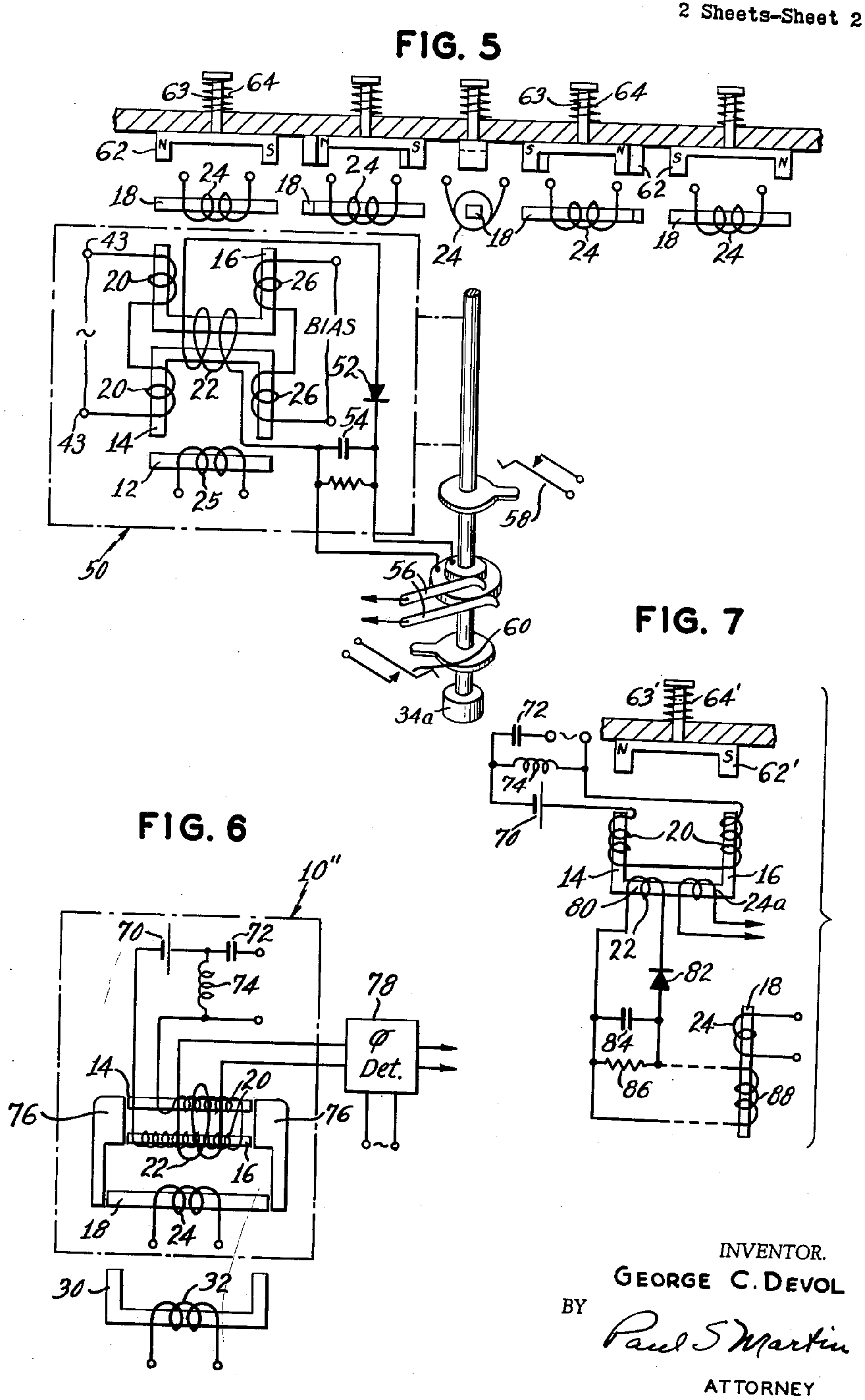
FIG. 5 is the wiring diagram of a control device for the apparatus in FIG. 1, in which a still further form of novel transducer is shown.
FIG. 6 is a diagrammatic illustration of a further modified form of transducer useful in FIGS. 1 and 5.
FIG. 7 is a diagrammatic illustration of a still further novel form of transducer.

In FIG. 5 there is shown a transmitter suitable for the transmitting end of a telemetering system for energizing the electromagnet 30, 32 of the apparatus of FIG. 1. In FIG. 5 further aspects of novelty of storage units are illustrated. Unit 50 there shown resembles much of unit 10 in FIG. 1, and is not described again, but instead corresponding reference numerals are used for corresponding parts. The unit 50 is seen to be carried for step-wise motion about the axis of drive unit 34a (FIG. 5) with the magnetic elements 14 and 16 extending radially of that axis. Unlike FIG. 1, the semi-permanent control elements 18 in FIG. 5 are not part of the transducer 50, in the sense that element 18 in FIG. 5 is not fixed in unit 50 and does not move when unit 50 is indexed. Instead, a series of units 18 are disposed in the several positions, and only one transducer 50 is provided. This transducer has a rectifier 52 in its output and, shunting the output, is a filter condenser 54. The output is connected to slip rings 56 for transmission to winding 32 of the receiver, either by wire or a radio link. Cam contacts 58 and 60 are provided for generating appropriate "read-out" and "reset" signals for the receiver.

Just as in FIG. 1, elements 18 in FIG. 5 are normally biased so that no output is obtained from unit 50 unless the initial magnetization of said elements 18 established by windings 24 is reversed. This is achieved in FIG 5 by shifting a permanent magnet 62 into magnetizing relationship with the magnetic control elements 18 opposite which those permanent magnets 62 are reciprocably supported. Magnets 62 having opposite poles at the longitudinal extremities thereof are reciprocably supported by slidable keystems 63 and have springs 64 for normally biasing them in spaced condition away from elements 18. These elements 62 and their supporting slide and spring structures may be regarded as a simple magnetic keyboard, in which electrical output is made available by depressing the keys, without resort to electrical contact. This concept is further elaborated below in connection with FIG. 7.

In the telemetering illustration of FIG. 5, the various magnets 62 may be allowed to remain in their normal position or they may be depressed in various combinations in dependence upon the operation of a mechanical analogue-to-digital convertor (not shown), operated, in turn, by a suitable meter or other source of control intelligence.

At the start of a cycle of operations, the various permanent magnets 62 may be either depressed or allowed to remain elevated. There may be sufficient attraction between each permanent magnet 62 and the element 18 so that magnet 62 is actually held down. Thereafter, whether the operated magnets remain depressed or are restored or elevated, control elements 18 will bear the recorded bits of information. Unit 50 is stepped through a cycle of operations so as to be set in line with all of the successive elements 18, and, in each position, coil 22 either produces output or not, depending on whether key-like elements 62, 64 were operated. Thereafter contacts 58 and 60 transmit "read" and "reset" signals. The reset signal is also impressed upon windings 24, so as to establish the "reset" state of magnetization of all of the elements 18 in readiness for a new cycle of operations. If magnets 62 were held down against the respective elements 18 by magnetic attraction, the reset pulses in windings 24 would naturally repel those magnets so as to be restored to normal, unoperated position and there held by respective springs 64. Suitable synchronization of drives 34a and 34 in the transmitter and the receiver naturally is to be provided.

It may be considered as an alternative in FIGS. 1 and 5 to operate cores 14 and 16 normally in a balanced, unsaturated condition, and to use element 18 when magnetized by electromagnet 30—32 to shift core element 16 into saturation thereby to "turn on" transducer 10. Coil 25 could then be used for bias to establish normal balance or, if no significant unbalance should exist, coil 25 could be omitted.

Unit 10 advantageously is magnetically shielded, except where it must be exposed to the external control element 30—32; and such partly open shielding is also advantageous in the other transducers herein described.

In FIG. 6 there is illustrated a form of unit 10″ corresponding to unit 10 in FIG. 1 which might be employed in substitution therefor. This unit is similar to devices in copending applications Serial No. 161,702, filed May 10, 1950, now U.S. Patent 2,741,757, and Serial No. 565,611, filed February 15, 1956 by the present inventor together with Eric B. Hansel, in the first application, and together with Marjorie Hansel, Administratrix of Hansel, in the latter case, now Patent No. 3,016,465 issued January 9, 1962. In those applications further explanation of transducer operation is to be found. Reference is also made to my Patent No. 2,988,237, which was copending herewith, where magnetically controlled apparatus is disclosed and claimed.

In the device of FIG. 6, the separate "reference" element 25, 12 of FIG. 1 is eliminated, and the character of the output resulting from changes in the magnetic condition of control element 18 is significantly altered. Readily saturable core elements 14, and 16 are employed in FIG. 6 together with windings 20 and 22 as previously described. The portions of winding 20 are here employed for the dual purpose of alternating current excitation and for direct current bias. Unit 70 represents an adjustable source of direct current bias, which is blocked by capacitor 72 from mixing with the alternating current supply and the direct current is transmitted by a choke 74 to winding 20. Control element 18 is seen in FIG. 6 to have a pair of horns 76 so as to extend element 18 into a C-shaped unit the ends of which are opposite the ends of both core elements 14 and 16. The bias in these core elements is such that one polarity of magnetization in element 18 will aid the bias established in one portion of winding 20 and buck that established by the other portion of winding 20, and the reverse polarity of magnetization in element 18 will have the reverse relation to the bias in core elements 14 and 16. Reference may be made to FIG. 2 for an understanding of what takes place when one of the core elements is in saturated condition and the other unsaturated, where the lines (12) and (18) appearing in FIG. 2 represent the magnetic condition of core elements 14 and 16. Significant output from winding 22 will be obtained of a certain phase in relation to the input alternating current supply. However, if the magnetization of element 18 is reversed, then significant output will still be obtained, but the phase will be exactly opposite that which previously prevailed. Thus, if coil 24 magnetizes control element 18 with one polarity, one phase of output will be obtained; and if that polarity of magnetization of control 18 is reversed by electromagnet 30, 32 in an information read-in operation, the phase of the output of coil 22 is reversed. A phase detector 78 is provided for discriminating between the two forms of output, and the output of the phase detector can then be utilized in any desired manner, as in the parallel decoder of FIG. 1 or otherwise.

Figure 3:
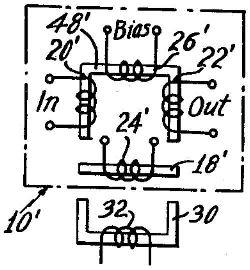
FIG. 3 is a diagrammatic illustration of a modified form of transducer useful in the organization of FIG. 1.
Figure 4:
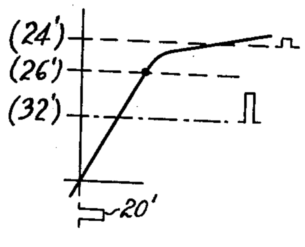
FIG. 4 is a diagram illustrating its operation.

In FIG. 6, as in FIGS. 1 and 3, an electromagnet that functions as a movable recording element, is movable into and out of control relation to a stationary semi-permanent magnetic control element 18 which has a magnetic detector assembled thereto. Information which is read into unit 10'' at any time is thereafter available continuously (so long as the alternating current energization remains in effect) for read-out purposes.

In FIG. 7 an organization very similar to FIG. 5 is shown, omitting the semi-permanent record elements 18 that appears in FIG. 5 opposite magnet 62. Magnet 62' controls the core structure directly.

The unit of FIG. 7 includes readily saturable magnetic core elements 14 and 16 and coil 20 having portions on both core elements 14 and 16 and adapted for both alternating current excitation and direct current bias as in FIG. 6, such that the upper ends of these core elements are of like polarity. Winding 22 serves as the output winding and here is arranged about a core element 80 which is magnetically coupled to both core elements 14 and 16. If either of these is saturated, then the winding portion 20 about the other is effectively coupled to output winding 22.

When magnet 62' is removed to its normal position, the condition of transformer 20, 24 is such that, with the two core portions 14 and 16 biased only part way toward saturation as represented by the lines (26) in FIG. 2, there will be virtually no output. However, when magnet 62' is brought down against the ends of the core assembly 14, 16, 80, one of the core portions 14 or 16 is saturated and the other is driven away from saturation in opposition to its bias, with the result that high output is obtained at coil 22. This output, suitably impressed on rectifier 82 and filter condenser 84 and resistor 86, is available for any suitable purpose. In the present system this can be advantageously utilized in order to locate the control element 62 appearing in FIG. 5 at a point remote from the rest of the transmitter illustrated in FIG. 5. Thus, the rectified output produced by winding 22 in FIG. 7 may be connected to a suitable winding 88 on a related semipermanent magnetic control element 18 in the telemetering transmitter of FIG. 5. Coil 24 on core 18 and coil 24*a* on core 80 perform the two functions performed in FIG. 5 by coil 24. Thus, coil 24 in FIG. 7, when energized appropriately, resets core element 18 to a standard, normal state and coil 24*a*, when energized appropriately, repels magnet 62'.

The foregoing specific description of the various aspects of the present invention are naturally susceptible to a wide range of variation and of varied application by those skilled in the art and consequently the disclosed invention should be construed broadly in accordance with its full spirit and scope.

What I claim is:

1. In combination, a saturable core, a pair of windings on said core, one winding being effectively coupled to the other by said core only when the core is not saturated, a semipermanent magnetic control element fixed in relation to said core and magnetically coupled to said core to induce saturation therein when appropriately magnetized, means including a coil magnetically linked to said control element and effective when energized to establish in said control element a normal standard magnetic state, and a magnetic recording device movable into and out of proximity to said magnetic control element, and said recording device being selectively operable so as to leave said control element in said standard state or to change the internal magnetic state of said control element to a new state, thereby to store information in said semipermanent control element.

2. In combination, saturable core means, a pair of windings on said core means, one winding being effectively coupled to the other only when the core means is in a predetermined magnetic condition, a semipermanent magnetic control element in fixed assembly with said core means and effective when in a predetermined state to impart said predetermined magnetic condition to said core means, means including a coil magnetically linked to said control element and effective when energized to establish in said control element a normal standard magnetic state, and a magnetic recording device movable into and out of proximity to said magnetic element, and said recording device being selectively operable so as to leave said control element in said standard state or to change the internal magnetic state of said control element to a new state, thereby to store information in said semipermanent control element.

3. In combination, a magnetometer, a semipermanent magnetic control element fixedly assembled therewith in a manner enabling the magnetometer to respond to the magnetic condition thereof, means including a coil magnetically linked to said control element and effective when energized to establish in said control element a normal standard magnetic state, and means movable into and out of proximity with said magnetic control element and said movable means being selectively operable so as to leave the control element in said standard state or to establish therein a lasting magnetic state internally which is different from said normal, standard state and thereby to store information in said semipermanent magnetic control element.

4. In combination, an assembly of magnetometers, an equal number of semipermanent magnetic control elements fixedly assembled to said magnetometers in a manner enabling each magnetometer to respond to the magnetic state of its respective magnetic element, means including a coil magnetically linked to each said control element and effective when energized to establish in said control element a normal standard magnetic state, and selectively operable magnetic recording means movable relative to said magnetic elements into successive cooperation therewith, said recording means being selectively operable either to leave the magnetic states of said control elements unchanged or to change the internal magnetic states of said magnetic elements, respectively.

4. The combination of claim 4, wherein said last-named means includes an electromagnet, information supplying means for selectively energizing said electromagnet, and means for shifting the electromagnet to and from said magnetic elements individually.

6. In combination, a magnetometer having a saturable magnetic core element, a permanent magnet reciprocably mounted for movement into and out of saturating condition relative to said core element, said magnet being biased toward said core by its own field, and an electromagnet optionally operable to repel said magnet from said core.

7. In combination, a saturable core, a pair of windings on said core, one winding being effectively coupled to the other winding by said core only when the core is unsaturated, magnetic bias means effective to shift the core partway toward saturation, a semipermanent magnetic control element fixedly assembled in relation to said core and effective when magnetized in aiding sense relative to the bias in the core to shift the core into saturation, and magnetic means movable into and out of operative relation to said magnetic control element for selectively controlling the magnetic state thereof.

8. The combination of claim 7 with a pulse excitation source for one of said windings of the polarity to magnetically excite said core in the adding sense relative to said bias means.

9. In combination, a core assembly including a pair of open-ended core elements with the ends of each adjacent the ends of the other, respectively, and a pair of windings on said core elements, said windings being in like sense on one core element and in opposite senses on the other core element, means biasing said core elements oppositely toward saturation, a magnetic member including a semipermanent magnetic control element and having poles thereof opposite the ends of both said core elements whereby said magnetic member when magnetized aids the bias in one of said core elements and bucks the bias in the other element, an electromagnet movable into proximity to said control element and selectively operable to establish therein retained magnetization of one polarity and a reset winding on said control element operable subsequently to establish therein the opposite polarity, alternating current excitation means for one of said pair of windings and phase sensitive output means connected to the other of said pair of windings.

10. In combination, a polarity-sensitive magnetometer of the alternating current excited type, a semipermanent control element in fixed assembly therewith and effective to produce output signals of opposite phase in response to opposite magnetic polarities therein, a reset winding coupled to said control element and arranged to establish therein a first retained magnetic polarity, and a magnetizing device optionally movable into proximity with said control element and selectively operable to reverse the retained magnetic polarity of said control element.

11. In combination, a magnetometer, a control element of semipermanent magnetic material disposed adjacent thereto in a manner enabling the magnetometer to respond to the condition of the control element, a reset coil in magnetizing relation to said element and effective when energized to establish therein a normal magnetic state, and magnetizing means mounted for movement relative to said control element and movable into and out of proximity with said control element and being effective to establish therein a lasting magnetic state different from said normal magnetic state or, selectively, being ineffective to change the control element from said normal state, thereby to store information in said semipermanent magnetic control element.

12. The combination of claim 11 wherein said movable means comprises a permanent magnet that is optionally moved into said proximity for selectively changing or not changing the internal magnetic state of said semipermanent magnetic control element, thereby to store information in said semipermanent magnetic control element.

13. In combination, a magnetometer, a control element of semipermanent magnetic material disposed adjacent thereto in a manner enabling the magnetometer to respond to the condition of the control element, a reset coil in magnetizing relation to said element and effective when energized to establish therein a normal magnetic state, and magnetizing means mounted for movement relative to said control element and movable into and out of proximity with said control element and effective to establish therein a lasting magnetic state different from said normal magnetic state, said movable magnetizing means comprising an electromagnet that is optionally energized or left deenergized when in said proximity, thereby to store information in said semipermanent magnetic control element.

14. In combination, a magnetometer, an array of control elements of semipermanent magnetic material, reset means in magnetizing relation to each of said elements respectively and effective when energized to establish therein a normal magnetic state, said magnetometer and said array of control elements being relatively movable and said magnetometer when disposed adjacent to one of said magnetic control elements being operative to respond to the magnetic condition thereof, and means movable into and out of proximity to said magnetic control element and operative to establish therein a lasting magnetic state different from said normal magnetic state, said magnetometer responding differently to said different magnetic states of said semipermanent magnetic control elements.

15. In combination, a keyboard including a plurality of key stems each bearing a permanent magnet and movable between a normal retracted position and an operated projected position, a magnetometer, and mechanical operating means disposing said magnetometer successively in positions opposite said permanent magnets of said key stems, said magnetometer being differently responsive when opposite to each of said permanent magnets, depending on whether the permanent magnet of each respective key stem is in its retracted or its projected position.

16. In combination, a keyboard including a plurality of keystems each bearing a permanent magnet and movable between a normal retracted position and an operated projected position, a magnetometer, means disposing said magnetometer successively in positions opposite said permanent magnets of said keystems, said magnetometer being differently responsive when a said permanent magnet is in its retracted position or its projected position, a magnetic core fixedly mounted opposite each of said permanent magnets and normally spaced substantially therefrom but approached thereby upon depression of a keystem, each keystem remaining depressed by the attraction of its permanent magnet carried toward said magnetic core, and a coil on each of said cores effective when energized with the proper polarity of current in relation to the polarity of the adjacent permanent magnet to repel said permanent magnet.

17. In combination, a plurality of stationary magnetometers, a plurality of semipermanent magnetic control elements disposed adjacent said magnetometers respectively in a manner enabling each magnetometer to respond to the magnetic condition of the associated semipermanent magnetic control element, magnetic reset means in magnetizing relation to each of said control elements and effective when energized to establish therein a normal magnetic state, an electromagnet having operating means to position the electromagnet in sequence adjacent said semipermanent magnetic control elements, said electromagnet being effective when energized to change the magnetic condition of the semipermanent magnetic control element as previously imparted by said reset means to a different magnetic condition, said magnetometers being differently responsive to said control elements when the associated control element is in its normal reset condition or in its changed condition.

18. Apparatus in accordance with claim 17, including a parallel decoder having input connections from said magnetometers.

19. In combination, a core assembly including a pair of open-ended core elements with the ends of each adjacent the ends of the other, respectively, and a pair of windings on said core elements, said windings being in like sense on one core element and in opposite senses on the other core element, means biasing said core elements oppositely toward saturation, a magnetic member including a semipermanent magnetic control element and having poles thereof opposite the ends of both said core elements whereby said magnetic member when magnetized aids the bias in one of said core elements and bucks the bias in the other element, and an electromagnet movable into proximity to said control element and selectively operable to establish therein retained magnetization of one polarity.

20. A keyboard including an array of alternating current excited magnetically sensitive devices, key stems each bearing a permanent magnet disposed opposite a respective one of said devices and operative to produce a substantial output therefrom only when its permanent magnet is projected close to said device, a rectifier in the output of each device, a magnetic memory element including a coil and a semipermanent magnetic core energized by the output of said rectifier to represent the event of the related key stem having been projected, and magnetic reset means associated with each semipermanent core for thereafter restoring the core to a different magnetic state.

21. A keyboard, including a series of transformers having primary and secondary windings and a saturable core element coupling said windings only when unsaturated, and a corresponding series of keystems individually mounted for selective operation bearing respective permanent magnets individually mounted for movement into and out of saturating relation to respective ones of said transformers.

22. A keyboard, including an array of key-stems each having a magnetic element operable between limits corresponding to the normal raised position and the depressed position of the key-stems, and means for registering the depression of each key-stem including a magnetic storage element of semipermanent magnetic material associated with each key-stem and arranged to be magnetized in response to depression of the associated magnetic element, and electromagnetically excited reset devices associated with said magnetic storage elements of semipermanent magnetic material, respectively, and effective to establish therein a normal standard magnetic state different from the magnetized condition resulting from depression of the key-stems.

23. A keyboard, including a series of magnetic storage elements of semipermanent magnetic material, electromagnetic reset means for establishing therein a standard reset magnetic condition, and means for selectively producing and storing in said elements a magnetic condition different from said reset condition, including an array of key-stems and magnetic control members carried by said key-stems respectively.

24. A keyboard, including a series of storage elements of semipermanent magnetic material, electromagnetic reset means associated with said elements for establishing therein a standard reset condition, an array of key-stems, and a series of permanent magnets disposed opposite from said series of elements but normally spaced therefrom and mounted to be moved selectively into magnetizing relationship with said series of magnetic storage elements for selectively producing therein a magnetized condition different from said reset condition.

25. A keyboard, including a series of magnetic storage elements of semipermanent magnetic material, electromagnetic reset means for establishing therein a standard reset magnetic condition, an array of key-stems, means including a series of magnetic elements arranged to be depressed by said key-stems selectively, and means responsive to the depression of said magnetic elements for imposing respective magnetizing fields on said storage elements, for thereby selectively changing the magnetic condition thereof to a different condition.

26. In combination, a control element of semipermanent magnetic material, a magnetic detector of the at-rest sensing type in sensing relation to said semipermanent magnetic control element, a reset coil magnetically linked to said control element and effective when energized to establish therein a standard normal magnetic state, and recording means operable to change the internal magnetic state thereof, said recording means and said semipermanent magnetic control element being mounted for relative movement into and out of magnetically coupled relation to each other, said recording means being optionally operated to change said control element to a new state and not so operated so as to leave said control element in said standard normal magnetic state, thereby to store information in said semipermanent magnetic control element.

27. In combination, a pair of magnetic core elements, a pair of windings on said core elements respectively and normally balanced in the absence of a unidirectional magnetic field, a semipermanent magnetic control element in control relation to at least one of said core elements and effective when magnetized to produce unbalance between said windings, means coupled to said windings to detect unbalance therebetween, means operable on said control element to establish therein a standardized magnetic state, and recording means effective to change the magnetic state of said semipermanent magnetic control element, said recording means and said control element being mounted for relative movement into and out of magnetically coupled relation to each other.

28. In combination, a series of control elements of semipermanent magnetic material fixed in a predetermined array, magnetic detecting means of the type that is responsive at rest to magnetic fields, said detecting means being operable to sense the respective magnetic states of said control elements, means for establishing in all said elements a standard magnetic condition, and magnetic recording means selectively operable to change the states of said semipermanent control elements, said recording means and said semipermanent magnetic control elements being mounted for relative movement into and out of magnetically coupled relationship to each other.

29. The combination in accordance with claim 28, wherein said recording means includes an electromagnet having selective input signal means rendering said recording means idle or operative when moved into magnetically coupled relation to said recording means.

References Cited in the file of this patent

UNITED STATES PATENTS

| | | |
|---|---|---|
| 2,700,703 | Nordyke | Jan. 25, 1955 |
| 2,702,875 | Bridges | Feb. 22, 1955 |
| 2,722,603 | Dimond | Mar. 1, 1955 |
| 2,740,110 | Trimble | Mar. 27, 1956 |
| 2,814,031 | Davis | Nov. 19, 1957 |